United States Patent Office 3,301,749
Patented Jan. 31, 1967

3,301,749
PESTICIDAL O,O-DIMETHYL-O-(2-[OR 3-] METHOXY - 4 - CYANOPHENYL) PHOSPHOROTHIOATE
Michihiko Sakai, Masayuki Kato, and Yasuo Sato, Kyoto, Kazuo Konishi, Osaka, and Tetsuya Okutani, Hyogo, Japan, assignors to Takeda Chemical Industries, Ltd., Osaka, Japan
No Drawing. Filed Nov. 29, 1963, Ser. No. 327,086
Claims priority, application Japan, Dec. 1, 1962, 37/54,255
12 Claims. (Cl. 167—30)

The present invention relates to novel pesticidal composition containing phosphoric acid esters and to their use for agricultural, veterinary and sanitary purposes. More particularly, the said phosphoric acid esters are those of the formula:

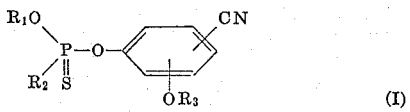

(I)

wherein $R_1$ and $R_3$ stand for lower alkyl, and $R_2$ stands for lower alkoxy or aryl.

The phosphoric acid esters of the above-mentioned Formula I have the effect to kill harmful pests such as various insects, acari and nematodes, with low toxicity to warm blooded animals, and, therefore, by a suitable choice of concentration of the phosphoric acid esters applied to pests and of the application method, the compounds are useful for new type pesticides.

There have been reported many kinds of pesticides, but only a few of them are actually utilized for agricultural, veterinary and sanitary purposes, because most of them can not be used without risk of harm to warm blooded animals, or the agents have only low effect to pests.

Although many attempts have been made to overcome the aforesaid shortcomings and other disadvantages, none, as far as the present inventors are aware, has entirely been successful when applied to practical use.

The present invention provides a series of new phosphoric acid esters of the above-mentioned Formula I, having a remarkable pesticidal activity upon application of a small quantity of compound to pests.

It is an object of the present invention to provide pesticides which are free from the above-mentioned shortcomings or disadvantages. Another object is to provide new phosphoric acid esters.

The present invention also contemplates providing methods for preparation of the said phosphoric acid esters. Among the further objects of the present invention is the provision of pesticides which contain the phosphoric acid esters (I), and their use in killing pests.

Other objects and advantages will become apparent from the following description taken in conjunction with the examples.

The phosphoric acid esters (I) of this invention can be synthesized through the reactions shown in the following reaction formula:

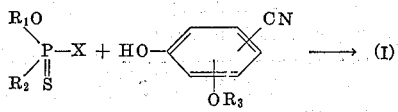

In the above-mentioned formula, X stands for a halogen, advantageously Cl, and $R_1$, $R_2$ and $R_3$ have the same significance as those in the Formula I, respectively.

The alkyl group represented by $R_1$ or $R_3$ in the foregoing formula, is lower alkyl and may, for example, be methyl, ethyl, propyl, isopropyl, butyl or the like. The alkyl group as the constituent of the alkoxy group represented by $R_2$ is lower alkyl as mentioned above. The two alkyl groups represented by $R_1$ or $R_3$ may be the same as or different from each other.

The aryl group represented by $R_2$ may, for example, be phenyl or substituted phenyl, as the substituent, there may be mentioned alkyl such as methyl, ethyl, propyl and isopropyl, and halogen such as chlorine and bromine.

As previously described, the phosphoric acid esters of the present invention may be provided by the reaction as shown in the abovementioned reaction formula.

The reaction may be carried out in the presence of a suitable solvent. The solvent may, for example, be water, alcohols such as methanol, ethanol, etc., ketones such as acetone, methylethylketone, etc., hydrocarbons such as benzene, toluene, xylene, etc., esters such as ethyl acetate, amides such as dimethylformamide, or a mixture consisting of two or more of these solvents. The reaction may be promoted by the addition of such organic bases as pyridine, triethylamine, dimethylaniline, or such alkali as carbonates, bicarbonates, metal hydroxides such as sodium hydroxide and potassium hydroxide, to the reaction system. The reaction may be effected at room temperature (15° to 30°), and may also be controlled by heating.

The following list sets forth typical phosphoric acid esters prepared by the method of the present invention, which are useful as active ingredients in the pesticidal compositions according to the present invention:

(1) O,O-dimethyl-O-(2-methoxy-4-cyanophenyl) phosphorothioate
(2) O,O-dimethyl-O-(3-methoxy-4-cyanophenyl) phosphorothioate
(3) O,O-diethyl-O-(3-ethoxy-4-cyanophenyl) phosphorothioate
(4) O,O-diethyl-O-(2-methoxy-4-cyanophenyl) phosphorothioate
(5) O-ethyl-O-(2-ethoxy-4-cyanophenyl)paratolyl-phosphonothioate
(6) O-ethyl-O-(2-methoxy-4-cyanophenyl) phenylphosphonothioate
(7) O-methyl-O-(3-methoxy-4-cyanophenyl) paratolylphosphonothioate
(8) O-methyl-O-(2-methoxy-4-cyanophenyl) paraanisylphosphonothioate
(9) O,O-diethyl-O-(2-methoxy-6-cyanophenyl)phosphorothioate
(10) O,O-dimethyl-O-(2-cyano-5-methoxyphenyl)phosphorothioate
(11) O-ethyl-O-(2-methoxy-6-cyanophenyl)phenylphosphonothioate
(12) O-methyl-O-(2-methoxy-6-cyanophenyl)parachlorophenylphosphonothioate
(13) O,O-dimethyl-O-(2-methoxy-6-cyanophenyl)phosphorothioate
(14) O,O-dimethyl-O-(2-ethoxy-4-cyanophenyl)phosphorothioate
(15) O,O-diethyl-O-(2-ethoxy-4-cyanophenyl)phosphorothioate
(16) O,O-diethyl-O-(2-cyano-4-methoxyphenyl)phosphorothioate
(17) O-ethyl-O-(2-cyano-4-methoxyphenyl)phenylphosphonothioate
(18) O,O-diethyl-O-(2-cyano-5-methoxyphenyl)phosphorothioate
(19) O,O-diethyl-O-(3-methoxy-4-cyanophenyl)phosphorothioate
(20) O,O-diethyl-O-(4-methoxy-3-cyanophenyl)phosphorothioate
(21) O,O-dimethyl-O-(2-methoxy-5-cyanophenyl)phosphonothioate In practice, and to realize the desired activity, the pesticides of the present invention are advantageously applied to harmful pests in the form of the compositions such as dust, emulsion, suspension or solution. In other words, the pesticidal compositions of the present invention comprise essentially at least one active compound (phosphoric acid ester) represented by the above-mentioned Formula I together with a suitable carrier (e.g. extender and/or conditioning agent) of the type commonly employed for the carriers of a known pesticidal agent. It is not intended, in this respect, that the present invention be limited to any specific proportions of active ingredient(s) (I) and adjuvant.

The compositions may be readily prepared ab initio or may e.g. be in the form of concentrates comprising active ingredient (I) with only a minor amount of an adjuvant, e.g. a surface active agent. Such a concentrate is economical as regards transportation, storage and the like, and may easily be admixed—prior to use—with additional adjuvant to give the desired concentration of the active ingredient when it is applied. The adjuvant may be selected depending on pests to be treated, properties of active ingredient and other adjuvant to be used together, and conditions of use.

Thus, if both the active ingredient and adjuvant(s) are water-soluble, the composition may be applied in the form of an aqueous spray. If, for example, a water insoluble adjuvant is employed—e.g. if the composition comprises a water-insoluble adjuvant—the composition may be applied as an aqueous dispersion. It is also possible e.g. merely to mix the active agent, in powder form, with a powdery adjuvant and to use the mixture (dust). Or, the powdery mixture may be suspended in water or in an oil, such as gasoline, kerosene, etc. which, upon mixing with water, forms e.g. an oil-in-water emulsion containing the active ingredient. When the compositions are used in dust form, the adjuvant (or diluent) may e.g. be talc, clay, diatomaceous earth, lime, calcium sulfate, kaolin and the like.

When the compositions are used in the form liquid, the adjuvant (diluent) is e.g. water, an aqueous solvent, a volatile or non-volatile organic solvent, e.g. an alcohol such as methanol, ethanol, a ketone such as acetone, methylethylketone, an ether such as dioxane, tetrahydrofuran, an aromatic hydrocarbon such as benzene, toluene, xylene, a halogenated hydrocarbon such as chloroform, carbon tetrachloride, an ester such as ethyl acetate and oil, the composition—as afore-indicated—taking the form of a solution, emulsion or suspension depending on the nature of the materials employed.

The new pesticidal compositions may further contain wetting agents, dispersing agents and emulsifiers such as a suitable surface active agent e.g. polyoxyethyleneglycolethers, polyoxyethyleneglycolesters, polyoxyethylene derivatives of sorbitan monolaurate (monooleate, monostearate), polyoxyethylenealkylarylether, alkyl sulfonate, alkylaryl sulfonate, alkyl sulfosuccinate. They may also contain adherent or sticking agents, and also other agricultural chemicals, e.g. fungicides, vermicides, all these materials being considered "adjuvants."

It is within the scope of the present invention to employ other adjuvants than those hereinbefore mentioned—e.g. solid or liquid diluents, emulsifiers, dispersants, surface active agents or otherwise—those already mentioned being merely illustrative.

The essence of the present invention does not reside in any specific adjuvant but in a composition consisting essentially of at least one compound of the Formula I and an appropriate pesticidal adjuvant which does not prejudice the activity of the composition.

Generally speaking, an effective amount for killing harmful pests is satisfied with the following quantitative relationships.

A dust or oil composition for direct application to pesticides may contain from 0.1 percent to 10 percent or more of the active ingredient(s) by weight. When the composition is prepared for actual use in the form of sprays or more dilute dusts, the content of the active ingredient(s) may vary from about 0.001 percent to as high as 0.1 percent by weight, the balance of the composition being one of the diluents and/or surface active agents (adjuvants) previously mentioned.

Content of the active ingredient in an aqueous dispersion may similarly vary from a very low percentage, e.g. 1 percent by weight, where the dispersion is applied directly to pests, to a relatively high percentage, e.g. 90 percent by weight, where the dispersion is employed as a concentrate, the balance in each case being constituted by an adjuvant or adjuvants.

Examples of pesticidal effect upon various pests by application of the phosphoric esters (I) are set forth as follows:

EXAMPLE 1

*Test for killing houseflies* (Musea domestica)

Acetone solutions of the respective test compounds set forth in the following table were prepared, and a definite amount of each of so prepared solutions was dropped on the back of thorax of houseflies. After 24 hours, the number of killed insects was counted. The results are shown in the following table:

| Test compound | Dose ($\gamma$/g.) | Percentage of killed insects |
|---|---|---|
| O-O-dimethyl-O-(2-methoxy-4-cyanophenyl) phosphorothioate | 200 | 100 |
| O-ethyl-O-(2-methoxy-4-cyanophenyl) phenyl-phosphonothioate | 200 | 100 |
| O-O-diethyl-O-(2-methoxy-4-cyanophenyl) phosphorothioate | 200 | 100 |
| O,O-dimethyl-O-(3-methoxy-4-cyanophenyl) phosphorothioate | 200 | 100 |
| O,O-dimethyl-O-(2-ethoxy-4-cyanophenyl) phosphorothioate | 60 | 100 |
| O,O-diethyl-O-(2-ethoxy-4-cyanophenyl) phosphorothioate | 60 | 100 |
| O,O-diethyl-O-(2-cyano-4-methoxyphenyl) phosphorothioate | 300 | 100 |
| O,O-dimethyl-O-(2-cyano-5-methoxyphenyl) phosphorothioate | 300 | 100 |

EXAMPLE 2

*Test for killing Chinese bean weevils* (Callosobruchus chinensis)

One cubic centimeter of each of acetone solutions of the test compounds set forth in the following table was poured into a Petri dish to cover the inside bottom of the dish. After the solvent was evaporated by airing gently, Chinese bean weevils were set free in the Petri dish. 24 hours later, the number of killed insects was counted to calculate the lethal concentration ($LC_{50}$).

Test compound:      $LC_{50}$, percent
    O-dimethyl-O-(2-methoxy-4-cyanophenyl)phosphorothioate _____ 0.000125–0.00025
    O-ethyl-O-(2-methoxy-4-cyanophenyl)phenylphosphonothioate _____ 0.00125–0.0025
    O,O-diethyl-O-(2-methoxy-4-cyanophenyl)phosphorothioate _____ 0.000625–0.000125
    O,O-dimethyl-O-(3-methoxy-4-cyanophenyl)phosphorothioate _____ 0.00125–0.0025

EXAMPLE 3

(1) *Test for killing soybean aphids* (Aphis glycines)

10% emulsion of each of the test compounds set forth in the following table was prepared. The test solution so diluted as indicated in the table was sprayed over soybean plants infested with soybean aphids at the rate of 20 cubic centimeters per plant. Survival rate was calculated after 2 days to obtain the result shown in the table.

No soybean aphid was observed ++
Soybean aphids decreased remarkably in number,
but still the remaining were observed alive +
Decrease of the number of soybean aphids before
spraying the test solutions was hardly observed —

| Test compound | Concentration of test compound, percent | Result |
|---|---|---|
| O-ethyl-O-(2-methoxy-4-cyanophenyl) phenylphosphonothioate | 0.05<br>0.025 | ++<br>++ |
| O,O-diethyl-O-(2-methoxy-4-cyanophenyl) phosphorothioate | 0.05<br>0.025 | ++<br>++ |
| O,O-dimethyl-O-(3-methoxy-4-cyanophenyl) phosphorothioate | 0.05<br>0.025 | ++<br>++ |
| O,O-dimethyl-O-(2-methoxy-4-cyanophenyl) phosphorothioate | 0.05<br>0.025 | ++<br>++ |
| Malathion [1] | 0.05<br>0.025 | ++<br>++ |

See footnote, column.—

(2) *Test for residual action of test compound*

| Test compound | Concentration of test compound | Mortality rate of soybean aphids transferred on soybean plants which had been sprayed the test solution two days before, percent |
|---|---|---|
| Control | | *−116.7 |
| O,O-dimethyl-O-(3-methoxy-4-cyanophenyl) phosphorothioate | 0.02<br>0.01<br>0.005 | 100<br>100<br>100 |
| Malathion [1] | 0.02<br>0.01<br>0.005 | *−80<br>*−130<br>*−253 |

[1] See footnote, column 11.
*Increased.

EXAMPLE 4

(1) *Test for killing Kanzawahadani*

(Tetranychus kanzawai)

10% emulsion of each of the test compounds set forth in the following table was prepared. The test solutions diluted with water to 0.05% of the respective test compounds were sprayed over soybean plants infested with Kanzawahadani at the rate of 20 cubic centimeters per plant. Survival rate was calculated after 2 and 7 days to obtain the result shown in the table. The marks, ++, + and − have the same meaning as those in Example 3, respectively.

| Test compound | Result | |
|---|---|---|
| | 2 days later | 7 days later |
| O,O-dimethyl-O-(2-methoxy-4-cyanophenyl)phosphorothioate | ++ | ++ |
| O-ethyl-O-(2-methoxy-4-cyanophenyl) phenyl phosphonothioate | ++ | ++ |
| O,O-diethyl-O-(2-methoxy-4-cyanophenyl) phosphorothioate | ++ | ++ |
| O,O-dimethyl-O-(3-methoxy-4-cyanophenyl) phosphorothioate | + | ++ |
| O,O-diethyl-O-(2-ethoxy-4-cyanophenyl) phosphorothioate | ++ | ++ |
| Pestan [2] | ++ | ++ |
| Control | − | −(increased) |

See footnote, column 11.

(2) *Test for ovicidal action to egg of Kanzawahadani*

[The result was observed 7 days after spraying]

| Test compound | Concentration of test compound, percent | Ovicidal rate, percent |
|---|---|---|
| Control | | 0 |
| O,O-diethyl-O-(2-methoxy-4-cyanophenyl) phosphorothioate | 0.1<br>0.5 | 100<br>100 |
| O-ethyl-O-(2-methoxy-4-cyanophenyl) phenylphosphonothioate | 0.1<br>0.05 | 100<br>100 |
| Pestan [2] | 0.1<br>0.05 | 100<br>100 |

See footnote, column 11.

EXAMPLE 5

*Test for killing nematoda*

10% emulsion of each of the test compounds set forth in the following table was prepared. The prepared emulsion was diluted with water to 0.05% of the test compound. 2 milliliters of thus obtained test solution were put in a glass dish, and then nematoda (Rhabditoides sp.) was put therein. The dish was covered and kept standing at 25° C. for 72 hours.

Rate of killed
Test compound: nematoda, percent
  O,O-dimethyl-O-(2-methoxy-4-cyanophenyl)
    phosphorothioate _____ 100
  O-ethyl-O-(2-methoxy-4-cyanophenyl)
    phenylphosphonothioate _____ 100
  O,O-diethyl-O-(2-methoxy-4-cyanophenyl)
    phosphorothioate _____ 100
  O,O-dimethyl-O-(3-methoxy-4-cyanophenyl)
    phosphorothioate _____ 100

EXAMPLE 6

*Test for killing matured larvae of rice stem borers*
(Chilo suppressalis)

Acetone solutions (50 γ/g.) of the respective test compounds set forth in the following table were prepared. Each of the test solutions thus prepared was applied on the backs of thorax of rice stem borers. After 24 hours, the rate of killed nematoda was observed.

Marks in the table have the same meaning as those in Example 5.

Rate of killed
Test compound: nematoda, percent
  O,O-dimethyl-O-(2-methoxy-4-cyanophenyl)phosphorothioate _____ 50–99
  O,O-diethyl-O-(2-methoxy-4-cyanophenyl)
    phosphorothioate _____ 50–99
  O,O-dimethyl-O-(3-methoxy-4-cyanophenyl)
    phosphorothioate _____ 100
  O-ethyl-O-(2-methoxy-4-cyanophenyl)phenylphosphorothioate _____ 100
  O,O-diethyl-O-(2-methoxy-6-cyanophenyl)
    phosphorothioate _____ 50–99
  O,O-diethyl-O-(2-methoxy-6-cyanophenyl)
    phosphorothioate _____ 50–99
  O,O-dimethyl-O-(2-ethoxy-4-cyanophenyl)
    phosphorothioate _____ 100
  O,O-diethyl-O-(2-ethoxy-4-cyanophenyl)
    phosphorothioate _____ 50–99
  O,O-diethyl-O-(2-cyano-4-methoxyphenyl)
    phosphorothioate _____ 50–99
  O-ethyl-O-(2-cyano-4-methoxyphenyl)
    phenylphosphorothioate _____ 50–99

EXAMPLE 7

*Test for killing soybean aphids (Aphis glycines)*

10% emulsion of each of the test compounds set forth in the following table was prepared. The test emulsion diluted with water to the concentration as in the table was sprayed on soybean plants infested with soybean aphids at the rate of 20 cubic centimeters per plant. After 48 hours, the rate of killed insects was observed to obtain the result shown in the table.

| Test compound | Concentration of test compound, percent | Rate of killed insect, percent |
|---|---|---|
| O,O-diethyl-O-(2-methoxy-4-cyanophenyl) phosphorothioate. | 0.02 | 100 |
|  | 0.01 | 94.1 |
|  | 0.005 | 80.1 |
| O,O-dimethyl-O-(2-methoxy-4-cyanophenyl) phosphorothioate. | 0.05 | 100 |
|  | 0.025 | 100 |
|  | 0.01 | 100 |
| O,O-dimethyl-O-(3-methoxy-4-cyanophenyl) phosphorothioate. | 0.005 | 100 |
| O-ethyl-O-(2-methoxy-4-cyanophenyl) phenylphosphonothioate. | 0.05 | 100 |
|  | 0.025 | 100 |

EXAMPLE 8

(1) *Test for killing green rice leaf hoppers* (noephotettix apicalis cincliceps) *and white back planhopper* (Sogata furcifera)

Solution containing each of the test compounds set forth in the following table was prepared. In thus prepared solution, stems of rice plants were dipped, respectively. After dryness by airing, each stem was put in glass tube, and then test insects (5 males, 5 females) were put in each glass tube. 24 hours later, the rate of killed insects was observed.

| Test compound | Concentration of test compound | Rate of killed insect, percent | |
|---|---|---|---|
|  |  | Green rice leaf hopper | White back planhopper |
| Control (non-treated) | 0 | 0 | 0 |
| O,O-dimethyl-O-(2-methoxy-4-cyanophenyl)phosphorothioate. | 0.025 | 100 | 100 |
|  | 0.0125 | 100 | 100 |
|  | 0.00625 | 95 | 100 |
| O,O-diethyl-O-(2-methoxy-4-cyanophenyl)phosphorothioate. | 0.025 | 100 | 100 |
|  | 0.0125 | 100 | 100 |
|  | 0.006 | 100 | 100 |
|  | 0.003 | 90 | 100 |
|  | 0.0015 | 90 | 100 |
| Sevin [3] | 0.025 | 100 | 100 |
|  | 0.0125 | 100 | 100 |
|  | 0.006 | 100 | 30 |
|  | 0.003 | 50 | 20 |
|  | 0.0015 | 30 | 0 |
| Malathion [1] | 0.025 | 100 | 100 |
|  | 0.0125 | 100 | 100 |
|  | 0.006 | 100 | 100 |
|  | 0.003 | 100 | 90 |
|  | 0.0015 | 100 | 50 |

See footnotes, column 11.

(2) *Test for residual action of test compounds to green rice leaf hopper and white black planhopper*

The test solution containing each of the compounds set forth in the following table was sprayed over rice plants. The stems were cut off from the treated plants after 3, 5 and 7 days, respectively. The cut stems were put in cages together with the insects, and after 24 hours, the rate of killed insects was observed to obtain the result shown in the table.

| Test insect | Test compound | Concentration of test compound, percent | Rate of killed insect, percent | | |
|---|---|---|---|---|---|
|  |  |  | 3 days later | 5 days later | 7 days later |
| Green rice leaf hopper. | Control | | 0 | 0 | 0 |
|  | O,O-diethyl-O-(2-methoxy-4-cyanophenyl) phosphorothioate. | 0.05 | 100 | 80 | 75 |
|  | Malathion [1] | 0.05 | 100 | 60 | 45 |
| White back planhopper. | Control | | 0 | 0 | 0 |
|  | O,O-diethyl-O-(2-methoxy-4-cyanophenyl) phosphorothioate. | 0.05 | 100 | 100 | 100 |
|  | Malathion [1] | 0.05 | 100 | 95 | 75 |

See footnote, column 11.

EXAMPLE 9

*Test for killing rice stem borers* (Chilo suppressalis)

10% emulsion of each of the test compounds set forth in the following table was prepared. Then the emulsion was diluted to the concentration as shown in the table. The resulting solution was sprayed on rice stem borers Survival rate was calculated after one week to obtain the results shown in the table:

| Test compound | Concentration of test compound, percent | Survival rate, percent |
|---|---|---|
| Control | | 86 |
| O,O-dimethyl-O-(2-methoxy-4-cyanophenyl) phosphorothioate | 0.05 | 7.3 |
| Ethyl parathion [4] | 0.025 | 8.1 |
| Control | | 26.4 |
| O,O-dimethyl-O-(3-methoxy-4-cyanophenyl) phosphorothioate. | 0.05 | 9.4 |
|  | 0.025 | 14.6 |
| Ethyl parathion [4] | 0.025 | 2.8 |
| Control | | 48.8 |
| O,O-diethyl-O-(2-ethoxy-4-cyanophenyl) phosphorothioate. | 0.05 | 1.0 |
|  | 0.025 | 6.9 |
| Ethyl parathion [4] | 0.05 | 3.3 |

See footnote, column 11.

EXAMPLE 10

*Test for killing citrus red mites* (Paratetranychus citri)

[Test method was referred to that in Example 4]

EXAMPLE 10

| Test compound | Concentration of test compound, percent | Decreasing rate of the test insects, percent | |
|---|---|---|---|
|  |  | 2 days later | 7 days later |
| Control | | 25.5 | 33.0 |
| O,O-diethyl-O-(2-methoxy-4-cyanophenyl)phosphorothioate. | 0.05 | 93.9 | 99.1 |
|  | 0.025 | 85.8 | 98.8 |
|  | 0.0125 | 74.4 | 97.4 |

EXAMPLE 11

*Test of toxicity to white mice*

Each of the test compounds was administered orally to four-week old male white mice and the mortality was observed after 24 hours to obtain median lethal dose (LD-50). The LD-50 values are shown in the following salis)

Test compound:

$LD_{50}$ (mg./kg.)

O,O-dimethyl-O-(2-methoxy-4-cyanophenyl) phosphorothioate _____ 4200

O,O-dimethyl-O-(3-methoxy-4-cyanophenyl) phosphorothioate _____ 1800

O,O-diethyl-O-(2-methoxy-4-cyanophenyl) phosphorothioate _____ 73

EXAMPLE 12

*Test of toxicity to adult houseflies* (Musca domestica) *and to matured rice stem borer larva* (Chilo suppressalis)

The acetone solution of each of the test compounds was applied on the back of test insects using micrometer-driven syringe. After 24 hours mortality was observed to obtain median lethal dose (LD–50) shown in the following table.

In the table, the compounds are represented by the corresponding numbers shown below:

O,O-dimethyl-O-(2-methoxy-4-cyanophenyl) phosphorothioate _____ I
O,O-dimethyl-O-(3-methoxy-4-cyanophenyl) phosphorothioate _____ II
O,O-diethyl-O-(2-methoxy-4-cyanophenyl) phosphorothioate _____ III
O-ethyl-O-(2-methoxy-4-cyanophenyl)phenyl- phosphonothioate _____ IV
O,O-diethyl-O-(2-methoxy-6-cyanophenyl) phosphorothioate _____ V
O,O-dimethyl-O-(2-methoxy-6-cyanophenyl) phosphorothioate _____ VI
O,O-dimethyl-O-(2-ethoxy-4-cyanophenyl) phosphorothioate _____ VII
O,O-diethyl-O-(2-ethoxy-4-cyanophenyl) phosphorothioate _____ VIII
O,O-diethyl-O-(2-cyano-4-methoxyphenyl) phosphorothioate _____ IX
O-ethyl-O-(2-cyano-4-methoxyphenyl)phenyl- phosphonothioate _____ X

| Test compound | Houseflies LD$_{50}$ (μg./g.) | Rice stem borer LD$_{50}$ (μg./g.) |
|---|---|---|
| I | 6.2 | 10 |
| II | 3.1 | 5–10 |
| III | 5.6 | 50.0 |
| IV | 7.6 | <50 |
| V | >200 | >50 |
| VI | >200 | >50 |
| VII | 30.8 | 10 |
| VIII | 29.7 | >50 |
| IX | 150 | >50 |
| X | >200 | >50 |
| Parathion [5] | 1.3 | 2.0 |
| EPN [6] | 2.7 | 3.2 |
| Malathion [1] | 25.1 | |
| DEP [7] | 13.1 | 21.8 |

See footnote, column 11.

EXAMPLE 13

*Test of residual action to soybean aphids* (Aphis glycines)

The emulsified liquid of each of the test compounds was sprayed to the potted seedling of soybean and after two days wingless females were transferred on the leaves of the sprayed plants. The mortality of transferred population was observed two days after the translocation. The result is shown in the following table.

The numbers representing the compounds in the table are the same ones as in the Example 12.

| Test compound | Concentration of test compound, percent | Mortality, percent |
|---|---|---|
| Control | | *–1.1 |
| I | 0.05 | 100 |
|  | 0.025 | 100 |
| II | 0.02 | 100 |
|  | 0.01 | 100 |
|  | 0.005 | 100 |
| III | 0.05 | 100 |
|  | 0.025 | 100 |
| IV | 0.05 | 100 |
|  | 0.025 | 100 |
| Malathion [1] | 0.05 | 100 |
|  | 0.025 | 100 |

See footnote, column 11.
*Increased.

EXAMPLE 14

*Test of ovicidal action to the eggs of Kanzawahadani* (Tetranichus kanzawai)

One day old eggs of the test mite on the leaves of kidney bean were employed for the test. The emulsified liquid of each of the test compounds was sprayed on the leaves on which the eggs were present and the percentage of unhatched eggs was observed after 7 days from the spray. The result is shown in the following table.

The numbers representing the compounds in the table are the same ones as in the Example 12.

| Test compound | Concentration of test compound, percent | Ovicidal rate, percent |
|---|---|---|
| Control | | 0 |
| III | 0.1 | 100 |
|  | 0.05 | 100 |
| IV | 0.1 | 100 |
|  | 0.05 | 100 |
| Pestan [2] | 0.1 | 100 |
|  | 0.05 | 100 |

See footnote, column 11.

EXAMPLE 15

*Test of residual action to adult female green rice leafhopper* (Nephotettix apicalis cincliceps)

After spraying emulsified liquid of each of the test compounds to potted rice plant, the stems were separated and put in the cage with test insects to observe after 24 hours the mortality of insects caused by the residues of the test compound sprayed on the stems. The test was executed on the 3rd, 5th and 7th day after spraying.

The number representing the compound in the table are the same ones as in the Example 12.

| Test compound | Concentration of test compound, percent | Mortality | | |
|---|---|---|---|---|
|  |  | 3 days later | 5 days later | 7 days later |
| Control | | 0 | 0 | 0 |
| III | 0.05 | 100 | 80 | 75 |
| Malathion [1] | 0.05 | 100 | 60 | 45 |

See footnote, column 11.

EXAMPLE 16

*Test for killing the larvae of rice stem borer* (Chilo suppressalis)

Each of the test compounds was emulsified in water to be sprayed on the potted rice plant with which the five-day old larvae of test insects had been infested. In a week after the spraying, the number of surviving larvae was counted to calculate the survival rate.

The numbers representing the compounds in the table are the same ones as in the Example 12.

| Test compound | Concentration of test compound, percent | Survival rate, percent |
|---|---|---|
| Control | | 86.0 |
| I | 0.05 | 7.3 |
| Ethyl Parathion [4] | 0.025 | 8.1 |
| Control | | 26.4 |
| II | 0.05 | 9.4 |
|  | 0.025 | 14.6 |
| Ethyl Parathion [4] | 0.025 | 2.8 |
| Control | | 48.8 |
| VII | 0.05 | 1.0 |
|  | 0.025 | 6.9 |
| Ethyl Parathion [4] | 0.05 | 3.3 |

See footnote, column 11.

EXAMPLE 17

*Spray test to adult female houseflies* (Musca domestica)

Test insects were put in cages by twenty insects per cage, and 5 milliliters of kerosene solution of each of test compounds were sprayed over the insects in the cage at the rate of 5 milliliters per cage. The percentage of knocked-down houseflies was observed at each time shown in the table after spraying.

The numbers representing the compounds in the table are the same ones as in the Example 12.

| Test compound | Concentration of test compound, percent | Percentage of knocked-down houseflies after spraying (minutes) | | | | | | | | |
|---|---|---|---|---|---|---|---|---|---|---|
| | | 10 | 20 | 30 | 40 | 50 | 60 | 70 | 80 | 90 |
| I | 0.05 | 0 | 5.0 | 25.0 | 60.0 | 65.0 | 70.0 | 80.0 | 100 | |
| II | 0.05 | 0 | 5.0 | 40.0 | 55.0 | 65.0 | 80.0 | 95.0 | 100 | |
| Diazinon [8] | 0.03 | 0 | 5.0 | 50.0 | 60.0 | 85.0 | 85.0 | 90.0 | 100 | |
| Malathion [1] | 0.05 | 0 | 0 | 5.0 | 20.0 | 35.0 | 50.0 | 70.0 | 90.0 | 100 |

See footnote.

EXAMPLE 18

*Test for residual action of test compounds to adult female houseflies* (Musca domestica)

One milliliter of acetone solution of each of the test compounds was dropped on a Petri dish. After the dropped solution in the dish dried, twenty insects were set free in the dish. At each time as shown in the table after the insects were set, knocked-down houseflies were counted.

The numbers representing the compounds in the table are the same ones as in the Example 12.

| Test compound | Concentration of test compound, percent | Days after the treatment | Percentage of knocked-down houseflies after spraying (hours) | | | | | | | | | | |
|---|---|---|---|---|---|---|---|---|---|---|---|---|---|
| | | | 0.5 | 1.0 | 1.5 | 2.0 | 2.5 | 3.0 | 3.5 | 4.0 | 4.5 | 5.0 | 5.5 |
| I | 0.05 (7.85 µg./cm.²) | 0 | 1.7 | 8.3 | 33.3 | 58.3 | 73.3 | 90.0 | 93.3 | 96.7 | 100 | | |
| | | 1 | 1.7 | 1.7 | 1.7 | 1.7 | 21.7 | 50.0 | 75.0 | 90.0 | 100 | | |
| | | 3 | 0 | 0 | 0 | 1.7 | 6.7 | 15.0 | 30.0 | 43.3 | 55.0 | 70.0 | 81.7 |
| II | 0.05 (7.85 µg./cm.²) | 0 | 1.7 | 28.3 | 41.7 | 78.3 | 95.0 | 100 | | | | | |
| | | 1 | 0 | 20.0 | 25.0 | 30.0 | 63.3 | 95.0 | 100 | | | | |
| | | 3 | 0 | 1.7 | 21.7 | 31.7 | 56.7 | 83.3 | 93.3 | 100 | | | |
| Malathion [1] | 0.01 (1.57 µg./cm.²) | 0 | 0 | 1.7 | 25.0 | 55.0 | 75.0 | 81.4 | 85.0 | 88.3 | 91.7 | 93.3 | 95.0 |
| | | 1 | 0 | 1.7 | 36.7 | 68.3 | 75.0 | 96.7 | 100 | | | | |
| | | 3 | 0 | 1.7 | 0 | 5.0 | 8.3 | 16.7 | 25.0 | 30.0 | 43.3 | 56.7 | 75.0 |

See footnote.

EXAMPLE 19

*Test of toxicity to adult male German cockroaches* (Blattella germanica)

The filter paper of 9 centimeters in diameter was treated with 1 milliliter of acetone solution of each of the test compounds. After the paper dried, it was set on the bottom of glass jar of 9 centimeters in diameters and 7 centimeters in depth. Fifteen cockroaches were driven into one jar. The inside wall of the jar was spread with a little amount of butter to prevent the escape of the insects. The mortality was observed after 24 hours.

The numbers representing the compound in the table are the same ones as in the Example 12.

| Test compound | Dose (µg./cm.²) | Mortality, percent |
|---|---|---|
| I | 314 | 100 |
| | 157 | 66.7 |
| II | 314 | 100 |
| | 157 | 86.8 |
| Dieldrin [9] | 314 | 100 |
| Malathion [1] | 314 | 100 |
| | 157 | 60.0 |

[1] Malathion: O,O-dimethyl S-(1,2-dicarbethoxyethyl)dithiophosphate.
[2] Pestan: O,O-diethyl S-(acetyl N-methylethylcarbamate) phosphorodithioate.
[3] Sevin: 1-naphthyl N-methylcarbamate.
[4] Ethyl: O,O-diethyl-O-p-nitrophenyl thiophosphate Parathion.
[5] Parathion: Diethyl-p-nitrophenyl thiophosphate.
[6] EPN: Ethyl-p-nitrophenylbenzene thionophosphate.
[7] DEP: Dimethyl-2,2,2-trichloro-1-hydroxyethyl phosphate.
[8] Diazinon: O,O-diethyl-O-(2-isopropyl-4-methylpyrimidyl-6-)thionophosphate.
[9] Dieldrin: 1,2,3,4,10,10-hexachloro-6,7-epoxy-1,4,4a,5,6,7,8,8a-octahydro-1,4-endo, hexo-5,8-dimethanonaphthalene.

For the purpose of giving those skilled in the art a better understanding of the present invention, the following illustrative examples of presently-preferred embodiments of the compositions containing phosphoric acid esters. In these examples, parts are by weight.

EXAMPLE 20

A powder comprising 2 parts of O,O-dimethyl-O-(3-methoxy-4-cyanophenyl)phosphorothioate and 98 parts of talc, according to the invention, is useful in killing insects.

EXAMPLE 21

An emulsion comprising 25 parts of O-ethyl-O-(2-ethoxy - 4 - cyanophenyl)paratolylphosphonothioate, 10 parts of alkyl sulfate, 15 parts of polyoxyethylenephenylether and 50 parts of xylene, according to the invention, is useful in killing mites.

EXAMPLE 22

A powder comprising 2 parts of O-methyl-O-(2-methoxy - 4 - cyanophenyl)paraanisylphosphonothioate, 5 parts of bentonite and 97 parts of talc, according to the invention, is useful in killing nematoda.

EXAMPLE 23

A wetting powder comprising 2 parts of O,O-dimethyl-O-(2-methoxy-4-cyanophenyl)phosphorothioate, 4 parts of sodium ligninsulfonate, 4 parts of polyoxyethylenealkylarylether, 3 parts of white carbon and 69 parts of clay, according to the invention, is useful in killing insects.

Having thus disclosed the invention, what is claimed is:

1. A phosphoric acid ester of the formula

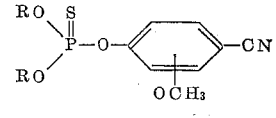

wherein R is alkyl of at most two carbon atoms, and the —OCH₃ group is in one of the positions ortho and meta to the —CN group.

2. O,O - dimethyl - O - (2 - methoxy-4-cyanophenyl)-phosphorothioate.

3. O,O - dimethyl - O - (3 - methoxy-4-cyanophenyl)-phosphorothioate.

4. A pesticidal composition which contains as an active ingredient, in minor but effective amount, a phosphoric acid ester of the formula

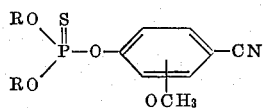

wherein R is alkyl of at most two carbon atoms, and the —OCH₃ group is in one of the positions ortho and meta to the —CN group.

5. A pesticidal composition which contains as an active ingredient, in minor but effective amount, O,O-dimethyl-O-(2-methoxy-4-cyanophenyl)phosphorothioate, and a major amount of a pesticide adjuvant.

6. A pesticidal composition which contains as an active ingredient, in minor but effective amount, O,O-dimethyl-O-(3-methoxy-4-cyanophenyl)phosphorothioate, and a major amount of pesticide adjuvant.

7. A pesticidal composition, in concentrate form, which contains as an active ingredient, in major amount, a phosphoric acid ester of the formula

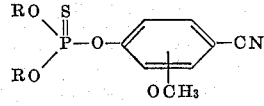

wherein R is alkyl of at most two carbon atoms, and the —OCH₃ group is in one of the positions ortho and meta to the —CN group.

8. A pesticidal composition, in concentrate form, which contains as an active ingredient, in major amount, O,O-dimethyl - O-(2-methoxy-4-cyanophenyl)phosphorothioate.

9. A pesticidal composition, in concentrate form, which contains as an active ingredient, in major amount, O,O-dimethyl - O-(3-methoxy-4-cyanophenyl)phosphorothioate.

10. A method of killing pests which comprises applying thereto, in effective amount, a phosphoric acid ester of the formula

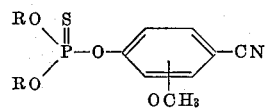

wherein R is alkyl of at most two carbon atoms, and the —OCH₃ group is in one of the positions ortho and meta to the —CN group.

11. The method of killing pests which comprises applying thereto, in effective amount, O,O-dimethyl-O-(2-methoxy-4-cyanophenyl)phosphorothioate.

12. The method of killing pests which comprises applying thereto, in effective amount, O,O-dimethyl-O-(3-methoxy-4-cyanophenyl)phosphorothioate.

References Cited by the Examiner

UNITED STATES PATENTS

| | | | |
|---|---|---|---|
| 2,887,505 | 5/1959 | Blair | 167—30 X |
| 3,005,749 | 10/1961 | Youngson | 167—30 |

FOREIGN PATENTS

| | | |
|---|---|---|
| 627,817 | 7/1963 | Belgium. |
| 655,875 | 8/1951 | Great Britain. |

OTHER REFERENCES

Nishizawa, Bull. Agr. Chem. Soc., Japan, vol. 24, No. 7, pp. 744–745, 1960.

Schrader, Angew. Chem., vol. 73, No. 10, pages 331–334, May 1961.

LEWIS GOTTS, *Primary Examiner.*

JULIAN S. LEVITT, *Examiner.*

RICHARD L. HUFF, *Assistant Examiner.*